US010435276B2

(12) United States Patent
Wagenleitner et al.

(10) Patent No.: US 10,435,276 B2
(45) Date of Patent: Oct. 8, 2019

(54) CHAIN LINK FOR A HIGHLY RESILIENT CONVEYOR CHAIN OF A MOVING WALKWAY, AN ESCALATOR OR A LIFT

(71) Applicant: INVENTIO AG, Hergiswil (CH)

(72) Inventors: Georg Wagenleitner, Rossleithen (AT); Manfred Gartner, Felixdorf (AT); Thomas Novacek, Schwechat (AT); Csaba Boros, Dunajska Streda (SK)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 16/328,899

(22) PCT Filed: Aug. 31, 2017

(86) PCT No.: PCT/EP2017/071829
§ 371 (c)(1),
(2) Date: Feb. 27, 2019

(87) PCT Pub. No.: WO2018/041931
PCT Pub. Date: Mar. 8, 2018

(65) Prior Publication Data
US 2019/0218071 A1 Jul. 18, 2019

(30) Foreign Application Priority Data
Aug. 31, 2016 (EP) .................... 16186570

(51) Int. Cl.
*B66B 23/02* (2006.01)
*B66B 7/06* (2006.01)
*B65G 17/38* (2006.01)

(52) U.S. Cl.
CPC ............ *B66B 23/024* (2013.01); *B65G 17/38* (2013.01); *B66B 7/066* (2013.01)

(58) Field of Classification Search
CPC ....... B66B 7/066; B66B 23/024; B65G 15/36; B65G 17/38; F16G 13/02; F16G 13/18; F16G 15/12
See application file for complete search history.

(56) References Cited

U.S. PATENT DOCUMENTS 633,738 A 9/1899 Sheldrick
4,757,681 A * 7/1988 Matsuno ............... B29C 53/564
59/35.1

(Continued)

FOREIGN PATENT DOCUMENTS

EP 1 876 135 B1 4/2011

OTHER PUBLICATIONS

International Search Report for International Application No. PCT/EP2017/071829 dated Nov. 23, 2017.

*Primary Examiner* — Gene O Crawford
*Assistant Examiner* — Keith R Campbell
(74) *Attorney, Agent, or Firm* — Knobbe Martens Olson & Bear LLP (57) ABSTRACT

Chain links and a conveyor chain that is highly resilient, in a tensile direction, for a moving walkway, an escalator or a lift. A chain link can include two chain link connector receiving regions arranged at opposing ends for receiving a chain link connector, which mechanically connects two neighboring chain links to one another in such a way that a tensile force can be transmitted therebetween. The chain link can also include a loop closed in a ring shape and surrounding the two chain link connector receiving regions. The loop can be formed with a fiber composite material. The fiber composite material is preferably in the form of a loop-like closed band, in which fibers, such as carbon fibers that can be subjected to high levels of tension, are embedded in an elastomer-matrix material.

20 Claims, 7 Drawing Sheets

(56) References Cited

U.S. PATENT DOCUMENTS

| | | | | |
|---|---|---|---|---|
| 4,863,418 | A | * | 9/1989 | Fillar ................... F16G 13/02 |
| | | | | 474/207 |
| 4,932,927 | A | * | 6/1990 | Fillar ................... B65G 17/38 |
| | | | | 474/207 |
| 5,215,616 | A | | 6/1993 | Fillar |
| 7,344,015 | B2 | | 3/2008 | Mustalahti et al. |
| 7,918,326 | B2 | * | 4/2011 | Illedits ................. B66B 23/026 |
| | | | | 198/330 |
| 2012/0024675 | A1 | | 2/2012 | Spielman et al. |
| 2012/0048689 | A1 | * | 3/2012 | Hastem-Mueller .... B65G 17/08 |
| | | | | 198/844.1 |
| 2012/0085618 | A1 | | 4/2012 | Duerrer et al. |

\* cited by examiner

CHAIN LINK FOR A HIGHLY RESILIENT CONVEYOR CHAIN OF A MOVING WALKWAY, AN ESCALATOR OR A LIFT

TECHNICAL FIELD

The present application relates to a chain link which is suitable for forming a conveyor chain of a moving walkway, an escalator, or a lift, that is highly resilient in the tensile direction. The application further relates to a conveyor chain formed by a chain link of this kind. Moreover, the application relates to a conveyor belt assembly for a moving walkway or an escalator comprising a conveyor chain of this kind, and to a lift system comprising a conveyor chain of this kind.

SUMMARY

Moving walkways, which are sometimes also referred to as travellators, and escalators, which sometimes also are referred to as moving staircases, are generally used to convey people in a horizontal direction or in a direction that is inclined relative to the horizontal. In the process, in the case of moving walkways a plurality of pallets is arranged in succession and so as to be mutually parallel, in such a way as to together form a revolving conveyor belt. Similarly, in the case of escalators a plurality of steps is arranged in succession and forms a revolving conveyor belt.

Conventionally, the pallets or steps are usually fastened to one or more revolving conveyor chains. In this case, pallets or steps that extend so as to be mutually parallel are generally in each case fastened at both sides to a conveyor chain. The revolving conveyor chain can then be conveyed with a conveyor wheel, for example a chain wheel, and the pallets or steps fastened thereto can thereby be displaced along a desired travel path. Together with the conveyor wheels that are typically driven with a motor, the steps or stairs fastened to the conveyor chains form what is known as a conveyor belt assembly.

In this case, the conveyor chain is conventionally assembled from a plurality of chain links. The chain links usually consist of sheet metal or link plates that are appropriately stamped into shape. In this case, chain links that are arranged in succession are generally interconnected by means of chain pins, for example, in the form of bolts.

Conveyor chains do not necessarily have to be produced from metal, however. For example, U.S. Pat. No. 5,215,616 A describes a conveyor chain for highly corrosive and abrasive environments, the chain links of which are produced from a fiber composite material. The chain links that are formed as loops comprise fibers that are embedded in a hard plastics resin matrix.

In order to both keep the number of chain links small and to also maximize mechanical resilience of the conveyor chain, the chain links of a conveyor chain for a moving walkway or an escalator may be relatively long. For example, a single chain link may be more than 100 mm long, or the length of a chain link may even correspond to the distance between two pallets or steps arranged in succession, for example, 400 to 600 mm.

While the conveyor chain extends between two opposing ends of the moving walkway or of the escalator in a largely linear, or at most slightly curved, manner, at the opposing ends of the moving walkway or of the escalator the conveyor chain has to be deflected at the conveyor wheels by substantially 180°, and in the process generally moves along an outer periphery of the conveyor wheels engaged in the conveyor chain. In this case, the conveyor wheels typically have a diameter in an order of magnitude of from 700 to 1200 mm.

Because the chain links are usually relatively long compared with the diameter of the conveyor wheels mean, if no specific measures are taken, such a deflection of the conveyor chain frequently results in what are known as polygon effects. Polygon effects of this kind generally arise when a conveyor wheel drives a conveyor chain in an interlocking manner, for example, with meshing. In this case, the conveyor chain cannot run onto or off the conveyor wheel in a circular manner, resulting in bends in said conveyor chain between the individual chain links Therefore, owing to the rigid chain links thereof that are of a substantial length, the conveyor chain rests over the conveyor wheel in the manner of a polygon having varying numbers of chords depending on the diameter of the conveyor wheel. If the conveyor wheel then rotates, for example at a constant speed, the polygonal contact of the conveyor chain results in various effective radii. A speed at which the conveyor chain is conveyed effectively then fluctuates periodically. Furthermore, undesired excitation may occur on the conveyor chain, in the longitudinal and/or transverse direction of the conveyor chain, which excitation may lead to oscillations that are usually associated with increased material stress, Polygon effects in moving walkways are described in detail in EP 1 876 135 B1, for example.

In the case of moving walkways and escalators, the non-uniform, e.g., pulsed, movements of the conveyor chain resulting from polygon effects are transmitted to pallets and steps, respectively, attached thereto, and are extremely undesirable owing to the decreased travel comfort resulting therefrom. In this case, polygon effects are more pronounced the smaller a diameter of the conveyor wheels is compared with a length of the chain links of the conveyor chain. However, in order to reduce the installation space required for a conveyor belt assembly, it is desirable to keep the diameter of the conveyor wheels as small as possible.

In order to reduce, or even entirely prevent, the impact of polygon effects, EP 1 876 135 B1 proposes a specifically designed deflection curved path. In this case, the conveyor chain is formed as a roller chain, in which rigid steel plates are connected with chain studs, and rollers are attached to the chain studs in each case. For the conveyor belt assembly proposed in EP 1 876 135 B1, two parallel travel tracks are provided for a roller chain of this kind, in each case alternately one roller being guided over the deflection curved path and the other roller being engaged with the conveyor wheel formed as a chain wheel. However, this solution is relatively complex and expensive.

Alternative traction means for moving walkways and escalators have been proposed, in which the pallets and steps, respectively, are fastened to belts or support cables and are conveyed thereby. Non-chain traction means of this kind and the use thereof for example in a moving walkway are described for example in US 2012/085618 A1 and U.S. Pat. No. 7,344,015 B2. In general, polygon effects do not occur when using a traction means of this kind.

However, owing to a structure of the support cable used or of the wire strands that extend in the belts used, traction means of this kind are prone to significantly greater elongation, in the form of wire rope elongation, compared with chain elongation that typically occurs in conveyor chains of a comparable tensile strength. Moreover, at least in the case of escalators, interlocking force transmission from a drive shaft to the step belt, such as can be achieved in the case of a chain wheel that is engaged in a conveyor chain, is extremely advantageous, whereas static friction between a deflection wheel and the wire rope or belt is usually not sufficient.

In contrast to moving walkways and escalators, lifts are usually used to convey people or goods in a vertical direction or in a direction that is steeply inclined relative to the horizontal. In the process, a lift car is often displaced inside a lift shaft using a suspension means that retains said lift car. Usually, flexible cables or belts are used as suspension means, which cables or belts are then usually wound around a traction disc of a drive unit and displaced thereby by means of a coupled motor.

Using conveyor chains instead of the hitherto conventional continuous cable-like or belt-like suspension means may also be advantageous in the case of lifts. In particular, catch structures can be easily attached to a conveyor chain of this kind, for example, by being attached to the chain pins or bolts that connect the individual chain links.

Appropriately designed structures of a traction disc of the drive assembly, which disc has been modified to the conveyor wheel, can then cooperate with said catch structures in an interlocking manner.

Hitherto, however, conveyor chains have been used in lift systems only rarely, owing to polygon effects that are almost impossible to prevent or that can be prevented only in a laborious manner, and a resultant non-uniform, jerky movement of the lift car.

A chain link for a conveyor chain of a moving walkway, an escalator or a lift may be required in which, inter alia, the above-described deficiencies of conventional conveyor chains are at least largely overcome. There may in particular be a need for a chain link of this kind for a conveyor chain by which the conveyor chain can be formed such that no or at most minor polygon effects arise during the conveying of said conveyor chain. Furthermore, there may be a need for a chain link that is mechanically highly resilient, is hard-wearing for a long period of time, and/or can be produced in a cost-effective manner There may furthermore be a need for a conveyor chain formed having a chain link of this kind. Furthermore, there may be a need for a conveyor belt assembly for a moving walkway or an escalator that is equipped with a conveyor chain of the kind, and for a moving walkway or an escalator equipped with said conveyor belt assembly. There may furthermore be a need for a lift system comprising a conveyor chain of this kind.

Requirements of this kind can be met by the embodiments described herein. Advantageous embodiments are specified in the following description.

According to a first aspect of the disclosure, a chain link for a conveyor chain of a moving walkway, an escalator, or a lift is proposed, which chain link is highly resilient in a tensile direction. The chain link comprises two chain link connector receiving regions that are arranged at opposing ends of the chain link, and a loop that is closed in a ring shape and surrounds the chain link connector receiving regions. The chain link connector receiving regions are designed for each receiving one chain link connector, respectively, which chain link connector mechanically interconnects two neighboring chain links in such a way that a tensile force can be transmitted from one chain link to the neighboring chain link. The loop is formed of a fiber composite material or composite material. The fiber composite material forming the loop comprises fibers that are embedded in an elastomer matrix material. The fibers extend along the ring-shaped loop. Owing to the elastomer matrix material, the chain link can be bent in a reversible manner in a direction transverse to the tensile direction, in radii of curvature of less than 500 mm, without plastic deformation of the fiber composite material occurring.

According to a second aspect of the disclosure, a conveyor chain for a moving walkway, an escalator or a lift is proposed. In this case, the conveyor chain comprises a plurality of chain links according to an embodiment of the first aspect, and a plurality of chain link connectors. In this case, neighboring chain links are in each case interconnected, so as to be resistant to tension, by chain link connectors that engage in the chain link connector receiving regions of said chain links.

A third aspect of the disclosure relates to a conveyor belt assembly for a moving walkway or an escalator. The conveyor belt assembly comprises a conveyor chain according to an embodiment of the second aspect, a plurality of pallets or steps that are fastened to the conveyor chain, a conveyor wheel or conveyor chain wheel for conveying the conveyor chain, and a drive for rotating the conveyor wheel. A plurality of catch structures for cooperating with the conveyor chain and for conveying the conveyor chain in the tensile direction by rotating the conveyor wheel are arranged on the conveyor wheel, close to an outer periphery of the conveyor wheel. Furthermore, at least one support structure is arranged on the conveyor wheel, close to the outer periphery, which support structure is arranged, at least in the peripheral direction in each case, between two neighboring catch structures and is designed to support loops of the conveyor chain from radially inside in a region between the chain link connector receiving regions thereof, and to thereby bend said loops radially outwards during rotation of the conveyor wheel.

A fourth aspect of the disclosure relates to a moving walkway or an escalator that comprises a conveyor belt assembly according to an embodiment of the third aspect.

A fifth aspect of the disclosure relates to a lift system which comprises at least one lift car, at least one conveyor chain according to an embodiment of the second aspect, and at least one drive for driving the conveyor chain. In this case, the drive comprises a conveyor wheel, on which a plurality of catch structures for cooperating with the conveyor chain and for conveying the conveyor chain in the tensile direction by rotating the conveyor wheel are arranged, close to an outer periphery of the conveyor wheel. At least one support structure is furthermore arranged on the conveyor wheel, close to the outer periphery, which support structure is arranged, at least in the peripheral direction in each case, between two neighboring catch structures and is designed to support loops of the conveyor chain from radially inside in a region between the chain link connector receiving regions thereof, and to thereby bend said loops radially outwards during rotation of the conveyor wheel.

Possible features and advantages of embodiments of the invention can be considered, inter alia, and without limiting the invention, to be based on the concepts and findings described in the following As mentioned above, conveyor chains are used in moving walkways, escalators and sometimes also in lifts in order to be able to convey components such as pallets, steps, or the lift car which are highly loaded by travelling passengers. In this case, the conveyor chain is usually assembled from chain links, in which rigid steel plates are interconnected by chain bolts. Conveyor chains of this kind can withstand high tensile loads of usually significantly over 50 kN.

However, in some embodiments, the individual chain links are not only highly resilient in the tensile direction, but instead are also substantially rigid in a direction transverse to said tensile direction. As a result thereof, the above-described polygon effects occur when the conveyor chain is deflected.

In particular in order to prevent said polygon effects, this application proposes assembling a conveyor chain of chain links which, although highly resilient in the tensile direction, also exhibit a degree of flexibility in a direction transverse to said tensile direction.

In particular, the disclosure proposes providing each chain link with chain link connector receiving regions by which neighboring chain links can be interconnected using chain link connectors. Each of the chain link connector receiving regions may, for example, be a mechanically reinforced structure, such as a cylindrical bushing, in which a chain link connector, such as a cylindrical bolt or a shaft, can engage. In this case, the chain link connector receiving region and the chain link connector engaging therein are preferably appropriately matched to one another, in such a way that they can both twist or rotate relative to one another.

At the same time, each chain link comprises a loop which surrounds the two chain link connector receiving regions and thus interconnects said regions so as to be resistant to tension. In some embodiments, the loop is closed in a ring shape and is formed using a fiber composite material.

In some embodiments, a fiber composite material is understood to be a multi-phase or mixed material consisting of at least two main components, in which reinforcing fibers are received in an embedding matrix. Appropriate mutual interactions between the two components provide a fiber composite material of this kind with more valuable properties than each of the two individual components involved. In some embodiments, fibers embedded in the matrix material may be extremely thin and have a diameter in the range of from a few μm to a few 10 μm for example. In some embodiments, the fact that a material in fiber form typically has a far higher strength in the fiber direction than the same material does in another form, is beneficial for the fiber composite material. In some embodiments, the thinner the fiber is, the greater the strength thereof. The reason for this can be assumed to be the fact that molecule chains are arranged so as to be increasingly aligned as the available surface area decreases. Moreover, inside thin fibers, distances between defects that may be at risk of breakage are very large, and therefore even long fibers are often largely free of such defects at risk of breakage.

In some embodiments, the embedded matrix material may serve, inter alia, to protect the thin fibers from damaging influences such as notching forces, corrosive chemicals, etc. For this purpose, the matrix material may preferably completely enclose the fibers on all sides. However, flexible matrix materials are suitable for the intended use, which matrix materials to not form cracks in the event of alternating bending stress. Cracks in the matrix material would lead to local stress peaks in the fiber composite material and lead to overloading and breakage of the fibers at these points. Therefore, in particular elastomers are suitable as the matrix material.

In some embodiments, mechanical properties such as the maximally permissible tensile force of a fiber composite material often depend substantially on a type and number of the fibers used therein, and on a manner in which said fibers are arranged spatially.

In some instances, according to an embodiment, it may be advantageous, for the chain links described herein, for the fiber composite material that forms the loop to be designed such that the loop can absorb forces of at least 50 kN, preferably at least 80 kN, more preferably at least 160 kN, in the tensile direction, which forces act on the chain link connector receiving regions in opposing directions.

In other words, the fiber composite material used for the chain link should be designed appropriately in order to be able to withstand without problem the significant tensile forces that act on the chain links during operation of a conveyor chain equipped with said chain link. In some embodiments, the fiber composite material should be able to absorb the significant tensile forces not only undamaged, but also without substantially lengthening in the process. In particular, a relative length change of for example more than 1% should not occur at the tensile forces mentioned. In particular in the case of conveyor chains for moving walkways and escalators or for lifts which are intended to be driven by a conveyor wheel that cooperates with the conveyor chain in an interlocking manner, a small maximally permissible length change of this kind is often necessary in order to be able to ensure correct operation of the conveyor belt assembly formed comprising said conveyor chain. If significantly greater length changes occur in the conveyor chain, there is a risk that the conveyor chain may no longer cooperate with the conveyor wheel in the intended manner, but instead at worst may jump or slip off the conveyor wheel.

In order to be able to achieve the desired tensile strength at a minimal length change for each of the chain links, the mechanical properties of the fiber composite material that forms the loop of the chain link should be adjusted appropriately. This can be achieved by appropriately selecting the number and/or the diameter of the fibers used therein. However, the orientation at which the fibers are received in the loop formed by the fiber composite material appears to be more important for the ability of said loop to withstand tension.

In addition to each chain link being able to withstand high tension, according to an embodiment, the fiber composite material forming the loop may be designed in such a way that, when bending forces act on the fiber composite material in a transverse direction that is transverse to the tensile direction, the fiber composite material can be bent in a reversible manner, in radii of curvature of less than 500 mm, preferably even of less than 200 mm. In this case, the permissible lower limit of the radius of curvature is dependent on the fiber composite material used. If this lower limit is not met, irreversible or plastic deformation of the loop remains, owing to creased fibers and/or a broken matrix material, and/or the fiber composite material is delaminated.

In other words, the fiber composite material used for the chain link should be designed so as to be able to withstand high tensile forces when said forces act on the two chain link connector receiving regions of the chain link in opposing directions for example. However, at the same time the fiber composite material should have a high degree of flexibility in a transverse direction transverse to said tensile direction, which flexibility allows said material to be bent in a reversible manner, in small bend radii of less than 500 mm. The bending forces acting in this case are generally significantly lower than the tensile forces acting on the chain link. The bending force acting on the fiber composite material in the transverse direction is typically between $1/100$ and $1/10,000$ of the maximally permissible force in the tensile direction, in order to bend the chain link in a reversible manner in a bend radius of between 50 mm and 500 mm.

As a result of the described preferred flexibility, a conveyor chain that is assembled from chain links formed having fiber composite material loops can be wound around a small conveyor wheel, for example, in small radii of curvature of 50 mm. In this case, the chain link can be bent even in regions between the chain link connector receiving regions thereof, in a curvature which can be specified or influenced for example by the support structures provided on the conveyor wheel. As a result of a flexibility of this kind in the transverse direction or bending that is forced during operation, polygon effects when the conveyor chain revolves around the outer periphery of the conveyor wheel can be largely prevented. However, in this case, the conveyor wheel must be segmented in a manner adjusted to said flexibility of the chain links.

In this case, according to an embodiment the fiber composite material that forms the loop is strip-shaped.

In this case, "strip-shaped" can be understood to be an elongate structure having a planar, for example rectangular, cross section. In some embodiments, the length of the fiber composite material is intended to be substantially greater than the width thereof, and the width is in turn intended to be substantially greater than the thickness thereof. In some embodiments, the thickness is measured in a direction orthogonal to a surface of the loop by means of which the loop surrounds the chain link connector receiving regions and in the process preferably mechanically contacts said regions.

A loop of this kind that is formed of a strip-shaped fiber composite material can both absorb high tensile forces in the longitudinal extension direction thereof, and also be bent in a reversible manner without problem when bending forces act in the thickness direction thereof.

According to an embodiment, the fiber composite material forming the loop comprises fibers that are embedded in an elastomer matrix material. In this case, the fibers extend along the ring-shaped loop.

In other words, it is not only the fibers of the fiber composite material that are intended to be flexible, but also the matrix material that encases said fibers. In this case, the fibers obtain their flexibility largely owing to their geometrical design, i.e., owing to their small diameter. The elastomer matrix material can surround the fibers at a material thickness that is substantially greater relative to the diameter of the fibers. While the fibers usually have a diameter of significantly less than 100 μm, a surrounding casing of elastomer matrix material may be for example 100 μm or even a few mm thick. In this case, the casing is flexible not owing to the geometrical design thereof, but instead owing to mechanical properties of the material used therefor. The elastomer matrix material may, for example, be polyurethane, silicone, rubber, butadiene rubber, butyl rubber, soft polyvinyl, or the like.

In some embodiments, the elongate fibers of the composite material extend along the ring-shaped loop, i.e., so as to be substantially in parallel with the extension direction thereof, optionally having minor deviations of for example less than 15°, preferably less than 5°, or more preferably less than 2°. This applies at least for a substantial portion of the fibers contained in the fiber composite material, which fibers then ensure the ability of the loop to withstand tension. However, it is not impossible for the fiber composite material to also contain fibers that do not extend along the loop. For example, the fibers may be received in the fiber composite material in the form of a non-woven or woven fabric.

According to an embodiment, the fibers received in the fiber composite material may be carbon fibers, glass fibers and/or metal fibers.

In particular, fiber composite materials comprising carbon fibers embedded in an elastomer matrix material, sometimes also referred to as carbon fiber, have been found to be extremely resistant to tension in a longitudinal direction in parallel with an extension direction of the carbon fibers. In some embodiments, carbon fibers are industrially manufactured fibers consisting of carbon-containing starting materials which are converted into graphite-like carbon by chemical reactions that are appropriate for the raw material. In particular anisotropic fibers exhibit high degrees of strength and rigidity while at the same time having a small ultimate elongation in the axial direction. Carbon fibers typically have a diameter in the range of from 5 to 10 μm. Usually, a plurality of, often several thousand, filaments are combined and worked for example into woven fabrics, webs, non-woven fabrics or multiaxial fabrics. In this case, a differentiation is made among different carbon fiber types. Fiber composite materials comprising high-strength carbon fibers (HT fibers—high tensity) have been found to be suitable for use in chain links. However, fiber composite materials comprising highly rigid carbon fibers (HM fibers—high modulus) appear to be even more advantageous.

Alternatively to or in combination with the carbon fibers, glass fibers can also be used in the fiber composite material. As further alternatives, extremely thin metal fibers can be incorporated in the fiber composite material and ensure the ability thereof to withstand tension.

Depending on the material and type of the fibers used in the fiber composite material, the fiber composite material may have a modulus of elasticity of significantly above 100 $kN/mm^2$, with the result that no significant elongation of the loop formed by the fiber composite material, preferably elongation of less than or equal to 1%, occurs in the event of loading in the tensile direction.

According to an embodiment, at least one fiber of the fiber composite material extends multiple times along the loop, in a manner wound in a ring shape.

Preferably, the entire loop is formed by a fiber composite material in which a single very long fiber or just a relatively small number of very long fibers is incorporated in the fiber composite material, and in the process is wound multiple times, for example a few hundred or even a few thousand times, along the loop in a ring shape. In this case, the individual windings extend so as to be substantially mutually parallel, and ensure the ability of the loop to withstand tension.

According to an embodiment, the loop of the chain link has a periphery of at least 800 mm, preferably at least 1000 mm.

In other words, the loop surrounding the chain link connector receiving regions, which loop ultimately indicates the length of the chain link formed thereby, is sufficiently large relative to the periphery thereof that the length of the loop substantially corresponds to the length of a pallet or a step of the moving walkway or the escalator, respectively, the conveyor chain of which is intended to be formed by the chain links. In some embodiments, a pallet or a step is typically at least 400 mm, often approximately 600 mm, long.

Using embodiments of the chain links described, a conveyor chain can be assembled which can both withstand the high tensile loads such as occur during use of said conveyor chain in a moving walkway or an escalator or optionally in a lift, and in which the individual chain links can also be bent in a resilient manner transversely to the tensile direction. In some embodiments, neighboring chain links are in each case interconnected, so as to be resistant to tension, with chain link connectors that engage in the chain link connector receiving regions of said chain links.

According to an embodiment, the chain link connectors may each comprise a base element from which two mutually spaced chain pins can protrude laterally. In some embodiments, one chain pin engages in the chain link connector region of one chain link, and the other chain pin engages in the chain link connector region of the neighboring chain link.

In some embodiments, the base element of the chain link connector may be provided as a separate element, for example in the form of a sheet or a profile, from which the two chain pins protrude laterally. Alternatively, other components of the conveyor chain or of the conveyor belt assembly formed using said conveyor belt may also be used as the base element. For example, one or more bolts may protrude on a pallet or a step, which bolts can function as chain pins for engaging in a chain link connector receiving region of the chain link. Optionally, one or more guide rollers for the pallets or the steps may also be attached to a chain pin of this kind.

The chain pins can preferably cooperate with the chain link connector receiving regions in an interlocking manner, for example, engaging in an opening that forms a chain link connector receiving region of this kind. The chain pins may be formed as simple bolts, for example, cylindrical bolts.

The chain pins may be mutually spaced in the tensile direction. In some embodiments, the chain pins may protrude from the base element on the same side and/or be arranged on opposing sides of the base element.

Using the conveyor chain described, it is possible, inter alia, to form a conveyor belt assembly for the moving walkway or the escalator with pallets or steps, respectively, thereof being fastened to the conveyor chain. In this case, the conveyor belt assembly further comprises a specific conveyor wheel and a motor that drives said conveyor wheel, by which motor the conveyor chain can be moved in the tensile direction.

Similarly to conventional conveyor wheels of moving walkways or escalators, the conveyor wheel comprises a plurality of catch structures close to the outer periphery thereof, by which catch structures the conveyor wheel can cooperate with the conveyor chain and can move the conveyor chain in the tensile direction by means of rotating the conveyor wheel. In this case, with respect to the catch structures thereof, the conveyor wheel may be designed in a manner similar to a chain wheel, e.g., may comprise projections or recesses on the outer periphery thereof, by means of which projections or recesses said conveyor wheel can cooperate in an interlocking manner with corresponding complementary structures on the conveyor chain.

In addition to said catch structures, one or more support structures are intended to be arranged on the conveyor wheel specifically described here. Said support structures are also located close to the outer periphery of the conveyor wheel. Usually, however, the support structures are arranged on the conveyor wheel so as to be slightly further inside than the catch structures. For example, one or more support structures may protrude in an axial direction from an end face of the conveyor wheel. In some embodiments, the support structure or the support structures are arranged, at least in portions, between catch structures that are neighboring in the peripheral direction. In some embodiments, said support structures may be of different geometrical designs. For example, a plurality of support structures may be designed as structures that protrude at points from the conveyor wheel, e.g., pins or bolts. Alternatively, said support structures may be designed as for example partially circular, elongate structures that protrude in the manner of motion links. In some embodiments, the support structures are intended to be designed such that, when the conveyor wheel is rotated and in the process moves the conveyor chain cooperating therewith, said support structures support at least portions of the flexible loops of the conveyor chain, between the chain link connector receiving regions thereof, locally or extensively from radially inside, and thus bend said loop radially outwards during rotation of the conveyor wheel.

In other words, in the case of the conveyor belt assembly proposed here, each chain link of the conveyor chain may be arranged such that the loop thereof is straight, provided that the chain link is subjected only to tension. However, if the chain link encounters the conveyor wheel of the conveyor belt assembly, the loop of the chain link is supported locally, from radially inside, by the support structure provided on the conveyor wheel. Since the fiber composite material used to form the loop is an elastomer, and therefore flexible, the loop is thus bent radially outwards. In this case, the loop substantially follows the periphery of the conveyor wheel or extends in parallel therewith. The bending of the loop of the chain link makes it possible to largely prevent or even entirely prevent polygon effects when conveying the conveyor chain.

According to an embodiment, the pallets or steps of the moving walkway or of the escalator, respectively, function as the chain link connector. In this case, two mutually spaced chain pins protrude laterally from the pallets or steps in each case. One of the chain pins engages in the chain link connector region of one chain link, while the other chain pin engages in the chain link connector region of the neighboring chain link.

In other words, separate components do not necessarily need to be provided as chain link connectors in order to connect neighboring chain links, but instead this task can be carried out by the pallets or steps themselves, by chain pins protruding laterally from said pallets or steps at suitable points.

According to an embodiment, coupling structures are provided on the conveyor chain, which coupling structures are fastened to the chain link connector receiving regions and are arranged laterally beside the loops. In some embodiments, the catch structures are arranged along the outer periphery of the conveyor wheel and are designed to cooperate with said coupling structures in an interlocking manner. In some embodiments, the support structure is arranged on an end face of the conveyor wheel that faces the loops of the chain links, and protrudes from said end face in the axial direction.

In other words, specific coupling structures may be provided on the conveyor chain, by means of which coupling structures the conveyor chain can cooperate with the catch structures formed on the conveyor wheel. The coupling structures are connected to the chain link connector receiving regions and are fastened therein in an engaging manner for example. In some embodiments, the coupling structures are located laterally beside the loops of the chain links. If the coupling structures of the conveyor chain cooperate with the catch structures of the conveyor wheel in an interlocking manner, in order to displace the conveyor chain by turning or rotating the conveyor wheel, the support structures arranged on the end face of the conveyor wheel come into contact with the loops of the chain links from radially inside, and bend said loops radially outwards. As a result, polygon effects when deflecting the conveyor chain about the conveyor wheel are largely minimized or even prevented.

According to a specific embodiment, the coupling structures may be designed as guide rollers that are rotatable about a shaft, and the shafts of which each engage in one of the chain link connector receiving regions, respectively. In this case, the catch structures are designed as recesses in the conveyor wheel that are shaped so as to be complementary to said guide rollers.

In other words, guide rollers or guide wheels may be provided on the conveyor chain, which guide rollers or wheels engage in one of the chain link connector receiving regions of a chain link by a shaft in each case. In this case, the guide rollers may be used for example to laterally guide and/or vertically support the conveyor chain during the movement thereof along a travel path. As soon as a chain link, together with the guide rollers or guide wheels thereof, reaches the region of a conveyor wheel, the guide rollers may assume the function of the coupling structures and cooperate with the catch structures of the conveyor wheel. In this case, the catch structures may be designed for example as recesses that are complementary to the guide rollers, such that a guide roller can engage in a recess of this kind in an interlocking manner.

In addition to the possibility described above of using the conveyor chain set out herein for a conveyor belt assembly for a moving walkway or an escalator, it is also possible in principle to use a conveyor chain of this kind as a suspension means in a lift system.

Analogously to the case of moving walkways and escalators, a conveyor wheel driven by a drive may also comprise catch structures on the outer periphery thereof, by which catch structures the conveyor wheel can cooperate with the conveyor chain, for example, with coupling structures attached thereto, and can convey the conveyor chain in this way with interlocking engagement. One or more support structures may again be provided close to the outer periphery of said conveyor wheel, by which support structures the loops of the conveyor chain can be supported from radially inside, in a region between the chain link connector receiving regions thereof, in order to thereby bend the loops radially outwards when the conveyor chain is guided over the conveyor wheel.

It has been found that the conveyor chain proposed herein, comprising flexible individual chain links, makes it possible to combine advantages of conventional conveyor chains with those of conventional flexible cables or belts. In particular, polygon effects can be prevented, and at the same time interlocking engagement between the conveyor wheel and the conveyor chain can lead to better force transmission between the drive and the conveyor chain.

In this case, the proposed lift system can be designed in various manners. For example, the conveyor chain may connect a counterweight of the lift system to the lift car of the lift system, and a drive that drives the conveyor chain may be arranged in a stationary manner in a lift shaft or in a machine room adjacent to said lift shaft. The conveyor chain can then be appropriately displaced in order to move the lift car and the counterweight in opposite directions inside the lift shaft. In this case, the conveyor chain is displaced relative to the lift shaft.

Alternatively, the drive of the lift system may be arranged directly on the lift car or on the counterweight itself. In this case, the conveyor chain may be arranged for example in a stationary manner in the lift shaft. Owing to the possible interlocking engagement between the conveyor chain and the conveyor wheel of the drive, the drive can then move along the stationary conveyor chain and in this way displace the lift car and/or the counterweight within the lift shaft.

It is noted that some of the possible features and advantages of the invention are described herein with reference to different embodiments. In particular, possible features are sometimes described with reference to a chain link, sometimes with reference to a conveyor chain, sometimes with reference to a conveyor belt assembly for a moving walkway or an escalator, and sometimes with reference to a lift system. A person skilled in the art will recognize that the features can be transferred, combined, adjusted or exchanged in an appropriate manner in order to arrive at further embodiments of the invention.

BRIEF DESCRIPTION OF THE DRAWINGS

Embodiments of the invention will be described in the following with reference to the accompanying drawings, neither the drawings nor the description being intended to be interpreted as limiting the invention.

The figures are merely schematic and are not to scale. The same reference signs in the different figures denote the same or similar features.

DETAILED DESCRIPTION

While embodiments of the chain link proposed herein and/or the conveyor chain that can be assembled therefrom can be used for various purposes, in particular in moving walkways, escalators, and lifts, possible embodiments thereof will be described in the following mainly with reference to use in a moving walkway.

Figure 1:
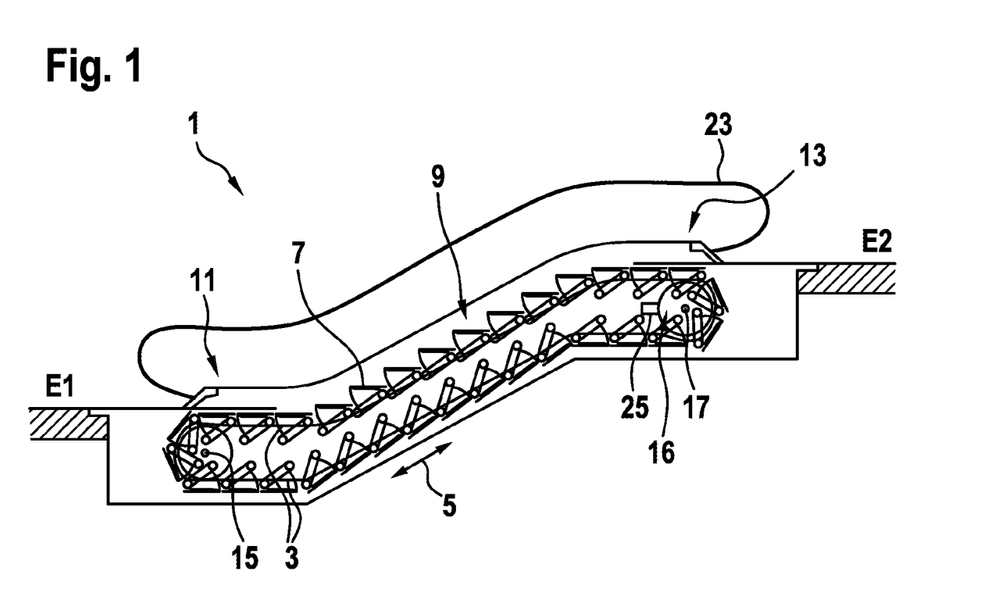
FIG. 1 shows an overview of an escalator, in which an embodiment of a conveyor chain according to an embodiment of the present invention can be used.
Figure 2:
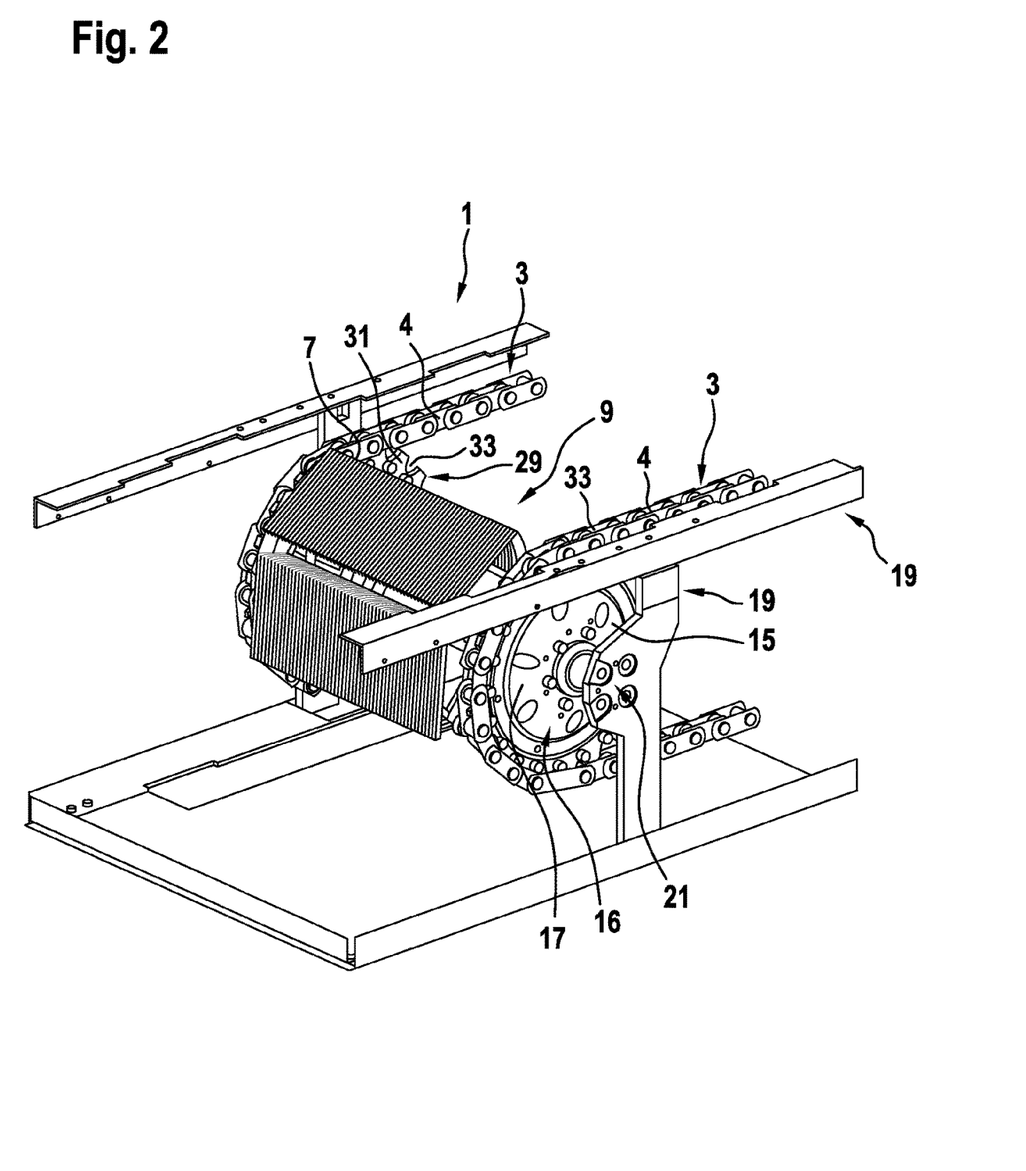
FIG. 2 is a perspective view of an end region of an escalator.

FIG. 1 shows an escalator 1 by way of example, by means of which people can be conveyed for example between two levels E1, E2. FIG. 2 is a perspective view of an end region of an escalator 1 of this kind comprising a conventional conveyor chain.

The escalator 1 comprises two conveyor chains 3 that are closed in a ring shape. The two conveyor chains 3 are assembled from a plurality of chain links 4. In the conventional conveyor chain 3 shown, the chain links 4 are formed of right chain pins produced from sheet metal. The two conveyor chains 3 can be displaced along a travel path in travel directions 5. The conveyor chains 3 extend so as to be mutually parallel and in the process are mutually spaced in a direction transverse to the travel direction 5.

A plurality of steps 7 extend between the two conveyor chains 3. Each step 7 is fastened, close to the lateral ends thereof, to one of the conveyor chains 3 in each case, and can thus be moved in the travel directions 5 by means of the conveyor chains 3. In this case, the steps 7 guided on the conveyor chain 3 form a conveyor belt 9. In order to be able to displace the conveyor chains 3, the escalator 1 comprises a drive assembly 25 (indicated only highly schematically in FIG. 1).

The conveyor chains 3 of the conveyor belt 9 are deflected in the region of a lower access point 11 and in the region of an upper access point 13 by deflection pulleys 15, 17. In this case, the deflection pulleys 15, 17 are formed as chain wheels having external toothing 29, outwardly protruding teeth 31 engaging in depressions in the conveyor chain 3 between neighboring recesses 33. In this case, the deflection pulleys 15, 17 are rotatably mounted, with bearings 21, on a supporting structure 19 that is usually in the form of a frameworks structure. At least one, but preferably two, of the deflection pulleys 15, 17 that are arranged side-by-side are driven by the drive assembly 25 and thus function as conveyor wheels 16.

The escalator 1 further comprises a handrail 23 which is generally driven together with the conveyor chains 3 and thus moves synchronously together with the conveyor belt 9.

In the case of the escalator 1 shown in FIG. 2, the chain links 4 of the conveyor chain 3 are relatively short with respect to a diameter of the deflection pulleys 17 and/or conveyor wheels 16. Although polygon effects occur when the conveyor chains 3, comprising the rigid chain links 4 thereof, are deflected, said polygon effects are small in the case of such proportions of the chain links 4 with respect to the deflection pulleys 17, and have hitherto generally been tolerated.

However, for reasons of minimizing installation space, it may be desirable to form deflection pulleys 17 having a smaller diameter. In addition, or alternatively, it may be possible to use longer chain links 4. Each of these measures results in polygon effects occurring in a more pronounced manner, and irregular conveying of the conveyor belt 9, cause thereby, can often no longer be tolerated.

Figure 3:
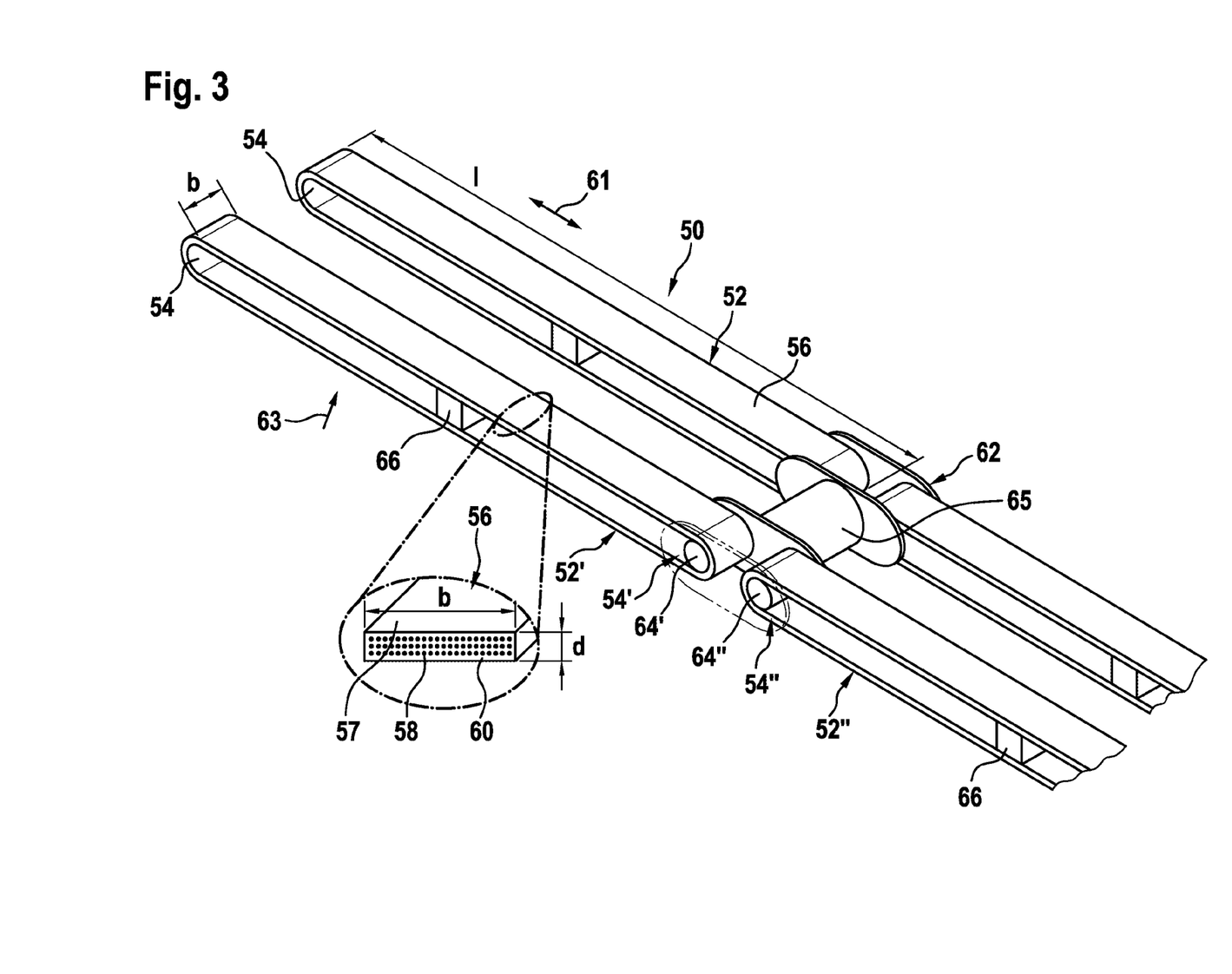
FIG. 3 shows two interconnected chain links of a conveyor chain according to an embodiment of the present invention.

FIG. 3 shows an embodiment of a conveyor chain 50 as can be used in escalators 1 or in moving walkways or lifts, and by means of which occurrence of polygon effects when deflecting the conveyor chain 50 can be largely prevented.

The conveyor chain 50 comprises a plurality of chain links 52. In this case, each chain link 52 comprises a loop 56 that is closed in a ring shape. In this case, the loop 56 is elongated, i.e. in large portions of the loop 56 opposing regions of the loop extend so as to be largely mutually parallel and the loop is curved by approximately 180° only at opposing ends.

In this case, at the opposing ends thereof the loop 56 surrounds respective chain link connector receiving regions 54. Said chain link connector receiving regions 54 may be designed in various manners and are used in each case for receiving portions of a chain link connector 62. For example, the chain link connector receiving regions 54 may merely be mechanically reinforced regions of the loop 56, in order to be able to receive the chain link connectors 62 there in a reliable and low-wear manner. Alternatively, the chain link connector receiving regions 54 may also be designed, using additional bushings or the like that are provided locally, to protect the material of the loop 56 from damage, in particular, by engaging regions of the chain link connectors 62.

As shown in the enlarged cross section in FIG. 3, the loop 56 is formed using a fiber composite material 57. In this case, the fiber composite material 57 comprises a plurality of mutually parallel elongate fibers 58, for example, carbon fibers. Said fibers 58 are embedded in an elastomer matrix material 60 such as polyurethane or silicone. In this case, the fibers 58 extend along the ring-shaped loop 56 so as to be largely mutually parallel and/or longitudinally. The fibers 58 thus extend over wide regions so as to be in parallel with a tensile direction 61 in which tension is exerted on the individual chain links 52 in the conveyor chain 50 by means of the chain link connectors 62 that engage at the opposing ends thereof.

In this case, the fiber composite material 57 used for the loops 56 is strip-shaped. In this case, a length l of the loop 56 in the tensile direction 61 may be several 100 mm, for example between 400 and 600 mm, long. A width b may be between several millimeters and several centimeters. A thickness d is generally less than 2 cm, usually even just a few millimeters.

Owing to the geometric design of the strip-like fiber composite material 57 of the loop 56 and of the fibers 58 arranged therein, and the flexibility of the surrounding elastomer matrix material 60, the chain link 52 can withstand very high tensile loads in the region of usually several 10 kN, often even more than 80 kN or even 160 kN, without damage and largely without significant longitudinal elongation (for example less than 1% relative elongation). At the same time, the chain link 52 can bend without problem in small bend radii of for example less than 500 mm, in particular, in the event of forces acting in a bending direction 63 transverse to the tensile direction 61, in the event of bending forces orthogonal to the main extension plane of the strip-like loop 56.

In the example shown in FIG. 3, the chain link connectors 62 of the conveyor chain 50 are formed comprising base elements 65, from which in each case pairs comprising two chain pins 64 protrude on two opposing sides. In this case, the two chain pins 64 of a pair are in each case arranged in succession in the tensile direction 61 and extend so as to be substantially in parallel with the direction of the width b of the strip-shaped loop 56. In this case, a front chain pin 64' of the chain link connector 62 engages in the chain link connector 54' at the rear end of a front chain link 52', while the second chain pin 64" engages in the chain link connector 54" at the front end of a further chain link 52" that is to be coupled therewith. The base element 65 that connects the two chain pins 64', 64" then couples the two chain links 52', 52" together in the tensile direction 61 so as to be resilient.

In this case, in the example shown, pairs of chain pins 64 in each case are formed on the two opposing sides of the base element 65, such that in each case pairs of two adjacent chain links 52 can be interconnected with a chain link connector 62.

In order, inter alia, to protect from damage regions of the loop 56 of the chain links 52 between the chain link connector receiving regions 54 provided at the opposing ends, said chain link connector receiving regions may be retained so as to be mutually spaced using spacers 66. Said spacers 66 may be arranged centrally, for example in the middle, between the chain link connector receiving regions 54. The spacers 66 may be of any shape, but must be flexible and may not cause kinks in the loop 56 when said loop is bent transversely to the tensile direction 61. The spacer 66 optionally extends continuously between the chain link connector receiving regions 54 of one chain link 52, or the spacer 66 may be omitted entirely.

Figure 4:
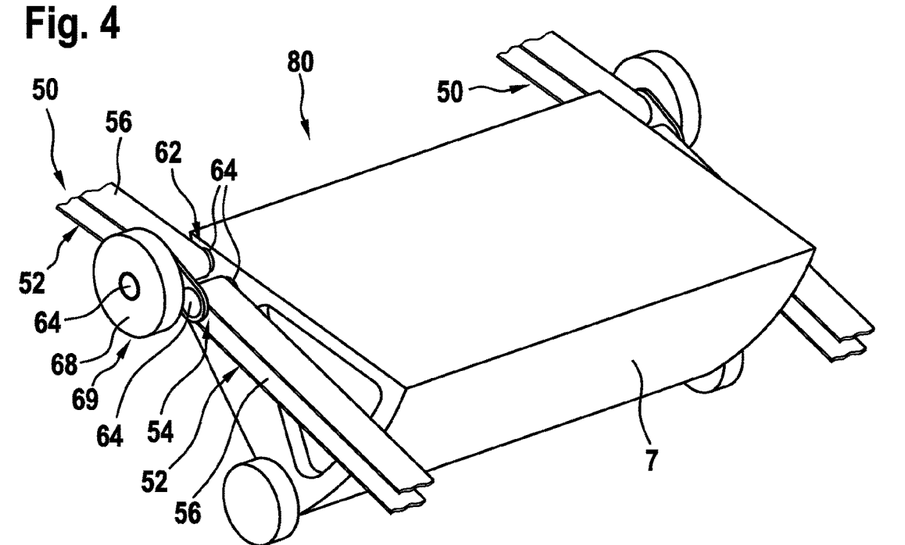
FIG. 4 shows a portion of a conveyor belt assembly comprising a conveyor chain according to an embodiment of the present invention.

FIG. 4 shows a portion of a conveyor belt assembly 80 for an escalator 1. In this case, in addition to two conveyor chains 50 and steps 7 attached thereto and therebetween, the conveyor belt assembly 80 also comprises a conveyor wheel 16 and a drive 25 for rotating the conveyor wheel 16 (not shown in FIG. 4).

In the embodiment shown in FIG. 4, pairs of chain pins 64 that protrude laterally from the step 7 function as chain link connectors 62. In this case, the chain pins 64 are again arranged in succession in the tensile direction 61, and each chain pin 64 engages in a chain link connector 54 of a chain link 52, in order to interconnect successive chain links 52 so as to be resistant to tension.

In this case, a rotatable guide roller 68 is furthermore arranged on each of the chain pins 64 of each pair. Said guide roller 68 can guide the conveyor chain 50 during the movement thereof in the travel direction 5, i.e., the conveyor chain 50 may be designed as a roller chain. In addition, as explained in the following, said guide rollers 68 may function as coupling structures 69 in order to be able to cooperate with a conveyor wheel 16 in an interlocking manner.

It goes without saying that a conveyor belt assembly 80 comprising just one conveyor chain 50 is also possible. In this case, the conveyor chain 50 is preferably arranged in the center of the steps 7.

Figure 5:
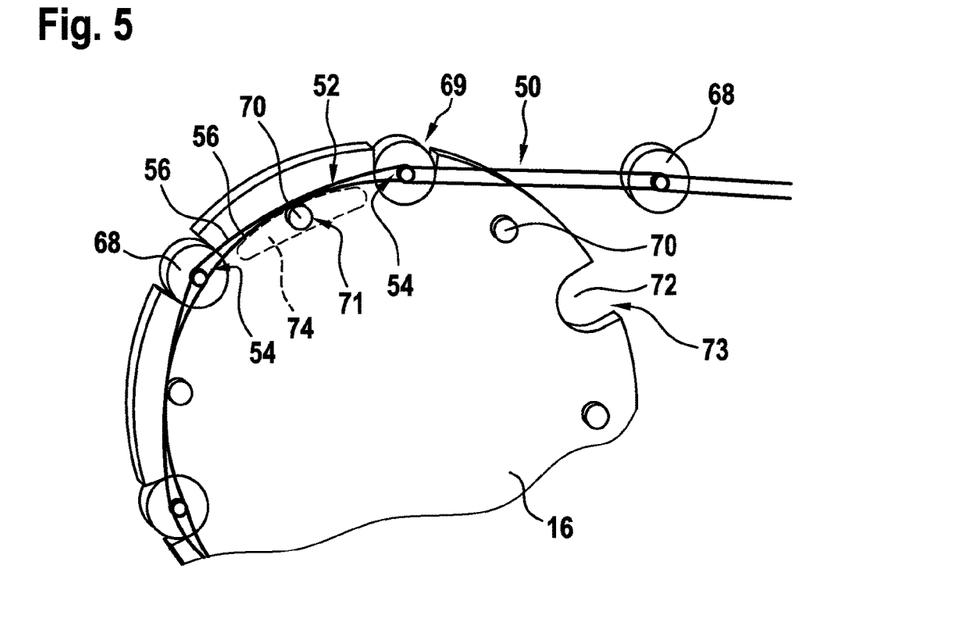
FIG. 5 shows a conveyor chain that is deflected around a conveyor wheel, according to an embodiment of the present invention.

FIG. 5 shows an example of a conveyor wheel 16 of this kind. The conveyor wheel 16 comprises catch structures 73 in the form of recesses 72 that are arranged over the outer periphery thereof. Said recesses 72 are designed, with respect to the size and shape thereof, to be approximately complementary to the guide rollers 68 that function as coupling structures 69.

In order to now be able to both deflect the conveyor chain 50 using the conveyor wheel 16 and to convey said conveyor chain by rotating the conveyor wheel 16, the guide rollers 68 attached to the conveyor chain 50 engage in the recesses 72 formed on the conveyor wheel 16. If the conveyor wheel 16 is rotated, the interlockingly engaging coupling structures 69 are carried along by the catch structures 73 of the conveyor wheel 16, and the conveyor chain 50, including the steps 7 fastened thereto, is moved.

In order to reduce arising polygon effects in the case of such deflection and conveying of the conveyor chain 50, support structures 71 are provided along the peripheral direction of the conveyor wheel 16, between neighboring catch structures 73. In the example shown, said support structures 71 are formed as pins or bolts 70 that protrude from the lateral end face of the conveyor wheel 16.

Alternatively, the support structure 71 could also be provided with different geometries. It is possible for example, as shown by the dashed line in FIG. 5, for partially circular support structures 74 that protrude in the manner of motion links to be formed between neighboring catch structures 73. As a further alternative, a circular disc having a smaller diameter could be used as a support structure 71, adjacently to the lateral end face of the conveyor wheel 16.

Irrespective of the specific embodiment of the support structure 71, said structure is designed to support the loops 56 of the chain links 52 from radially inside in a region between the chain link connector receiving regions 54 of said chain links, and to thereby bend them radially outwards during rotation of the conveyor wheel 16.

The fact that the individual chain links 52 are flexible in a direction transverse to the tensile direction 61 owing to the loops 56 thereof that are formed of fiber composite material 57, and the support structures 71 can bring about just such bending of the chain links 52 during deflection of the conveyor chain 50 on the conveyor wheel 16, can cause the shape of the chain links 52 to approximate the circular outer contour of the conveyor wheel 16 when said links are bent, and polygon effects to thus be prevented.

Figure 6:
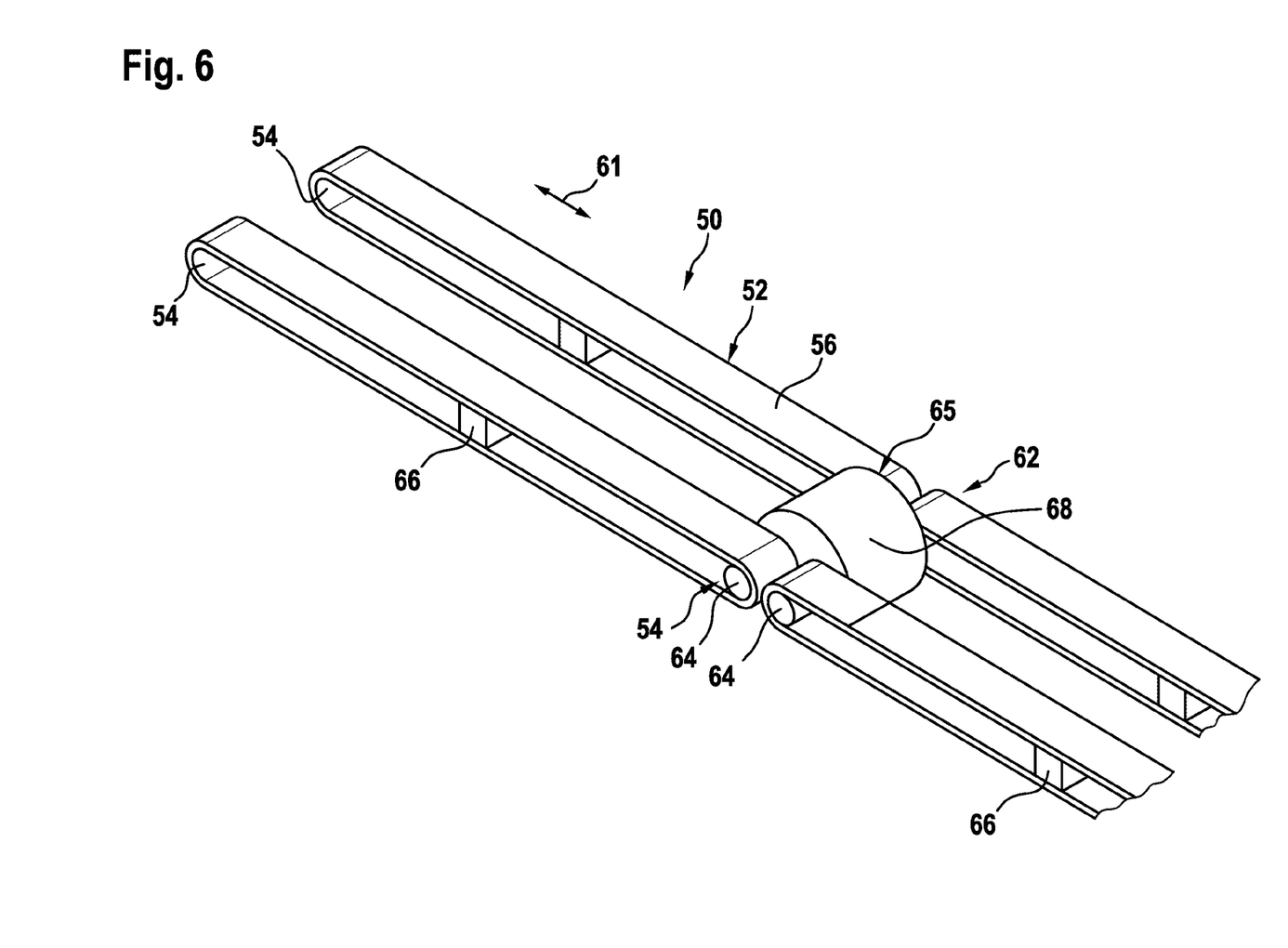
FIG. 6 shows two interconnected chain links of a conveyor chain according to an alternative embodiment of the present invention.

FIG. 6 shows an alternative embodiment of a conveyor chain 50. In this case, a number of features of the components of the conveyor chain 50 correspond to those of the conveyor chain 50 shown in FIG. 3. However, the chain link connectors 62 are designed in a different manner. A guide roller 68 is formed on a base element 65, and in each case pairs of chain pins 64 protrude on both lateral end faces of said guide roller 68.

Figure 7:
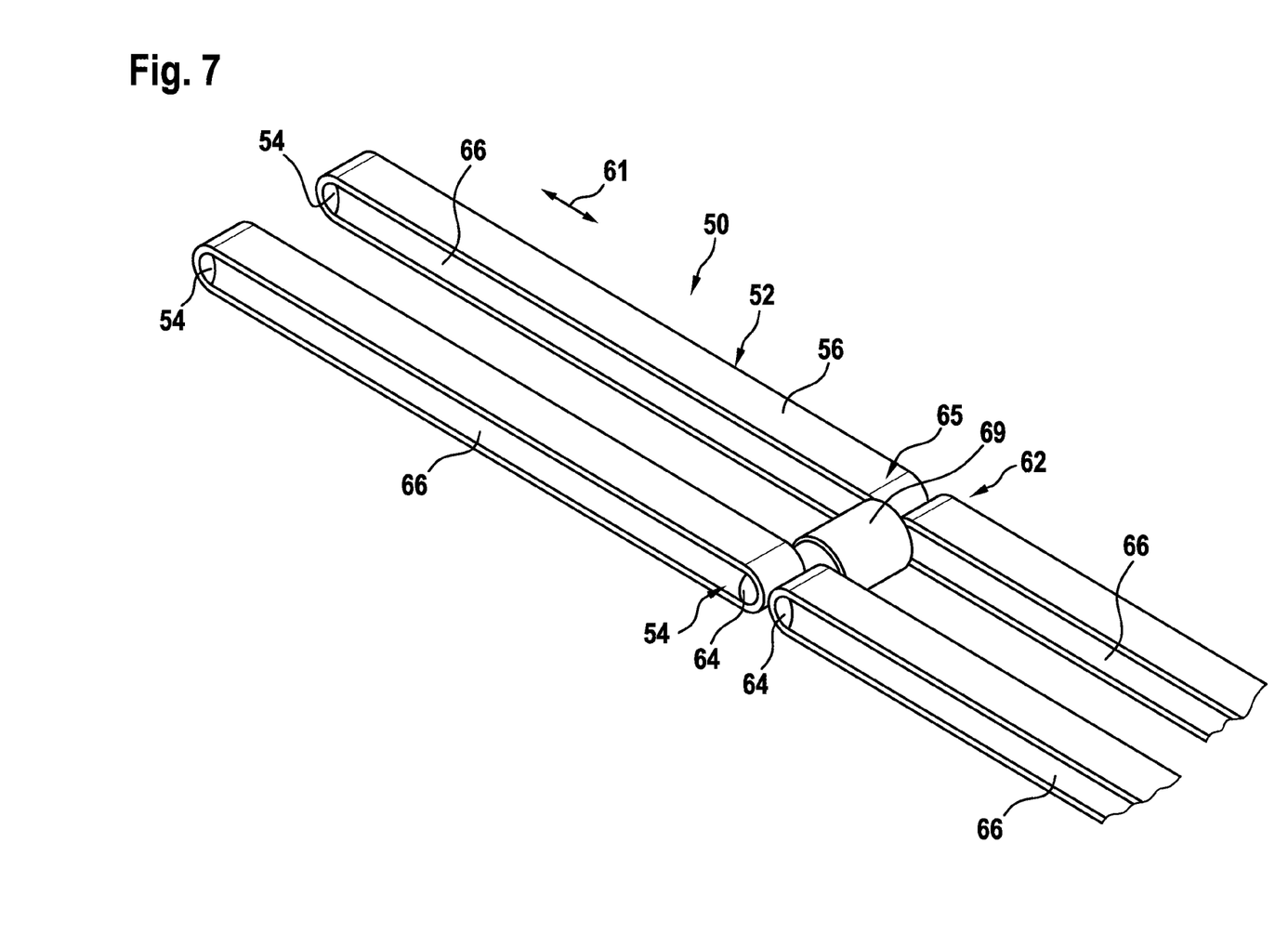
FIG. 7 shows two interconnected chain links of a conveyor chain according to a further alternative embodiment of the present invention.

FIG. 7 also shows an alternative embodiment of a conveyor chain 50. The chain link connectors 62 are formed integrally. The base element 65 comprises an engaging bolt as a coupling structure 69, on the two lateral end faces of which bolt pairs, in each case, of chain pins 64 are formed. The spacers 66 extend between the chain link connector receiving regions 54 over the entire length of the loop 56. For example, the spacers 66 may be inserted into the loops 56 by means of a vulcanization process during construction of the conveyor chain 50, the chain pins 64 being permanently fastened in the loop 56 using vulcanization. The material of the spacer may be of a different Shore hardness from the elastomer matrix material of the fiber composite material.

Figure 8:
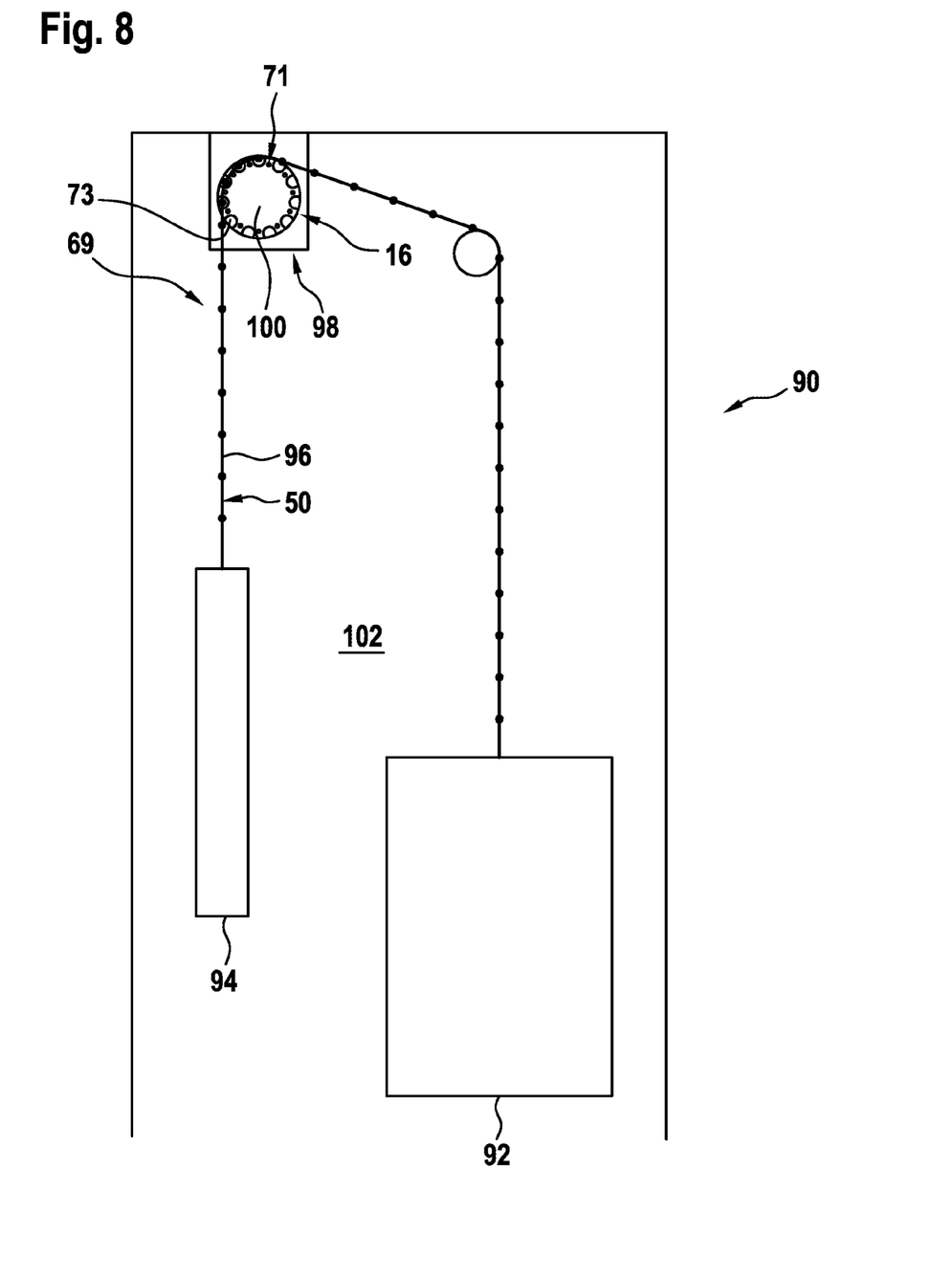
FIG. 8 shows an overview of a lift system, in which an embodiment of a conveyor chain according to an embodiment of the present invention can be used.

Finally, it is noted that embodiments of the conveyor chains 50 described herein can also be used in lift systems 90. FIG. 8 is a highly schematic view of a lift system 90 of this kind, in which a lift car 92 and a counterweight 94 are interconnected by a suspension device 96.

In this case, unlike the case conventionally, the suspension device 96 is not formed as a continuous support belt or support cable, but instead as a conveyor chain 50. A drive 98 may comprise an embodiment of the conveyor wheel 16 described above as a traction sheave 100 in order to be able to move the conveyor chain 50. In this case, coupling structures 69 provided on the conveyor chain 50 may cooperate in an interlocking manner with corresponding catch structures 73 on the conveyor wheel 16. In this case, the possible interlocking engagement between the conveyor wheel 16 and the conveyor chain 50 can allow for very efficient and largely slippage-free conveying of the lift car 92 and of the counterweight 94.

In an alternative embodiment (not shown), instead of being arranged in a stationary manner in the lift shaft 102, as shown in FIG. 8, the drive 98 may be attached to the lift car 92 or to the counterweight 94 and be moved together therewith. In this case, the conveyor chain 50 may be fastened for example in a stationary manner in the lift shaft 102, and the lift car 92 or the counterweight 94 can be drawn up and/or lowered on the conveyor chain 50, using the drive 98 and the conveyor wheel 16 driven thereby. In this case, the interlocking engagement between the conveyor wheel 16 and the conveyor chain 50 allows for reliable and precisely positioned travel of the mentioned components 92, 94. It is optionally also possible for a plurality of lift cars 92 to move along a single conveyor chain 50. When the drive 98 is arranged on the lift car 92, the counterweight can be omitted.

It should finally be noted that terms such as "having" and "comprising", etc. do not exclude any other elements or steps, and terms such as "one" or "a" do not exclude a plurality. It should furthermore be noted that features or steps that have been described with reference to one of the above embodiments can also be used in combination with

The invention claimed is:

1. A chain link for a conveyor chain of a moving walkway, an escalator or a lift, that is highly resilient in the tensile direction, the chain link comprising:
   two chain link connector receiving regions that are arranged at opposing ends of the chain link and are each for receiving one chain link connector that mechanically interconnects two neighboring chain links in such a way that a tensile force can be transmitted in the tensile direction from one chain link to the neighboring chain link;
   a loop that is closed in a ring shape and surrounds the two chain link connector receiving regions, the loop being formed by a fiber composite material,
   wherein the fiber composite material forming the loop comprises fibers that are embedded in an elastomer matrix material and that extend longitudinally along the ring-shaped loop, the elastomer matrix material configured to allow the chain link to be bent in a reversible manner in a direction transverse to the tensile direction, in radii of curvature of less than 500 mm, without occurring plastic deformation of the fiber composite material.

2. The chain link of claim 1, wherein the loop can absorb forces of at least 50 kN in the tensile direction, which forces act on the chain link connector receiving regions in opposing directions, and the elongation of the chain link in the case of a tensile force of 50 kN is less than or equal to 1%.

3. The chain link of claim 1, wherein, when the loop is bent in a reversible manner in radii of curvature of between 50 mm and 500 mm, the bending force acting on the fiber composite material in the transverse direction is between $1/100$ and $1/10,000$ of the maximally permissible force in the tensile direction.

4. The chain link of claim 1, wherein the fibers arranged in the elastomer matrix material are arranged so as to be substantially mutually parallel and in parallel with the tensile direction.

5. The chain link of claim 1, wherein the fiber composite material forming the loop is strip-shaped.

6. The chain link of claim 1, wherein the fibers of the fiber composite material are selected from the group comprising carbon fibers, glass fibers, and metal fibers.

7. The chain link of claim 1, wherein at least one fiber of the fibers of the fiber composite material extends multiple times along the loop in a manner wound in a ring shape.

8. The chain link of claim 1, wherein the loop has a periphery of at least 800 mm.

9. A conveyor chain for a moving walkway, an escalator or a lift, wherein the conveyor chain comprises:
   a plurality of chain links, each chain link comprising:
      two chain link connector receiving regions that are arranged at opposing ends of the chain link and are each for receiving one chain link connector that mechanically interconnects two neighboring chain links in such a way that a tensile force can be transmitted in the tensile direction from one chain link to the neighboring chain link;
      a loop that is closed in a ring shape and surrounds the two chain link connector receiving regions, the loop being formed by a fiber composite material,
      wherein the fiber composite material forming the loop comprises fibers that are embedded in an elastomer matrix material and that extend longitudinally along the ring-shaped loop, the elastomer matrix material configured to allow the chain link to be bent in a reversible manner in a direction transverse to the tensile direction, in radii of curvature of less than 500 mm, without occurring plastic deformation of the fiber composite material; and
   a plurality of chain link connectors, wherein neighboring chain links of the plurality of chain links are in each case interconnected, so as to be resistant to tension, with chain link connectors that engage in the chain link connector receiving regions of said chain links.

10. The conveyor chain of claim 9, wherein the chain link connectors each comprise a base element from which two mutually spaced chain pins protrude laterally, wherein one chain pin engages in the chain link connector receiving region of one chain link, and the other chain pin engages in the chain link connector receiving region of the neighboring chain link.

11. A conveyor belt assembly for a moving walkway or an escalator, wherein the conveyor belt assembly comprises:
   a conveyor chain comprising:
      a plurality of chain links, each chain link comprising:
         two chain link connector receiving regions that are arranged at opposing ends of the chain link and are each for receiving one chain link connector that mechanically interconnects two neighboring chain links in such a way that a tensile force can be transmitted in the tensile direction from one chain link to the neighboring chain link;
         a loop that is closed in a ring shape and surrounds the two chain link connector receiving regions, the loop being formed by a fiber composite material,
         wherein the fiber composite material forming the loop comprises fibers that are embedded in an elastomer matrix material and that extend longitudinally along the ring-shaped loop, the elastomer matrix material configured to allow the chain link to be bent in a reversible manner in a direction transverse to the tensile direction, in radii of curvature of less than 500 mm, without occurring plastic deformation of the fiber composite material; and
      a plurality of chain link connectors, wherein neighboring chain links of the plurality of chain links are in each case interconnected, so as to be resistant to tension, with chain link connectors that engage in the chain link connector receiving regions of said chain links;
   a plurality of pallets or steps that are fastened to the conveyor chain;
   a conveyor wheel configured to convey the conveyor chain;
   a drive configured to rotate the conveyor wheel;
   wherein a plurality of catch structures for cooperating with the conveyor chain and for conveying the conveyor chain in the tensile direction by rotating the conveyor wheel are arranged on the conveyor wheel, close to an outer periphery of the conveyor wheel; and
   wherein at least one support structure is arranged on the conveyor wheel, close to the outer periphery, the support structure is arranged, at least in the peripheral direction, between two neighboring catch structures and is designed to support loops of the conveyor chain from radially inside in a region between the chain link connector receiving regions thereof, and to thereby bend said loops radially outwards during rotation of the conveyor wheel.

12. The conveyor assembly of claim 11, wherein the pallets or steps function as chain link connectors and two mutually spaced chain pins protrude laterally therefrom, wherein one chain pin engages in the chain link connector receiving region of one chain link, and the other chain pin engages in the chain link connector receiving region of the neighboring chain link.

13. The conveyor assembly of claim 11, wherein:
coupling structures are provided on the conveyor chain, the coupling structures are fastened to the chain link connector receiving regions and are arranged laterally beside the loops;
the catch structures are arranged along the outer periphery of the conveyor wheel and are designed to cooperate with the coupling structures in an interlocking manner;
the support structure is arranged on an end face of the conveyor wheel that faces the loops, and protrudes from said end face in the axial direction.

14. The conveyor assembly of claim 13, wherein:
the coupling structures are configured as guide rollers that are rotatable about a shaft, and the shafts of which each engage in one of the chain link connector receiving region, respectively;
wherein the catch structures are formed as recesses in the conveyor wheel which are shaped in a manner complementary to the guide rollers.

15. The conveyor assembly of claim 11, wherein the conveyor assembly is configured for use in a moving walkway or escalator.

16. A lift system, comprising:
at least one lift car,
at least one conveyor chain comprising:
  a plurality of chain links, each chain link comprising:
    two chain link connector receiving regions that are arranged at opposing ends of the chain link and are each for receiving one chain link connector that mechanically interconnects two neighboring chain links in such a way that a tensile force can be transmitted in the tensile direction from one chain link to the neighboring chain link;
    a loop that is closed in a ring shape and surrounds the two chain link connector receiving regions, the loop being formed by a fiber composite material, wherein the fiber composite material forming the loop comprises fibers that are embedded in an elastomer matrix material and that extend longitudinally along the ring-shaped loop, the elastomer matrix material configured to allow the chain link to be bent in a reversible manner in a direction transverse to the tensile direction, in radii of curvature of less than 500 mm, without occurring plastic deformation of the fiber composite material; and
  a plurality of chain link connectors, wherein neighboring chain links of the plurality of chain links are in each case interconnected, so as to be resistant to tension, with chain link connectors that engage in the chain link connector receiving regions of said chain links, and
at least one drive for driving the conveyor chain, wherein the drive comprises a conveyor wheel on which a plurality of catch structures for cooperating with the conveyor chain and for conveying the conveyor chain in the tensile direction by rotating the conveyor wheel are arranged close to an outer periphery of the conveyor wheel;
wherein at least one support structure is furthermore arranged on the conveyor wheel, close to the outer periphery, the support structure is arranged, at least in the peripheral direction in each case, between two neighboring catch structures and is designed to support loops of the conveyor chain from radially inside in a region between the chain link connector receiving regions thereof, and to thereby bend said loops radially outwards during rotation of the conveyor wheel.

17. The lift system of claim 16, wherein the loop can absorb forces of at least 50 kN in the tensile direction, which forces act on the chain link connector receiving regions in opposing directions, and the elongation of the chain link in the case of a tensile force of 50 kN is less than or equal to 1%.

18. The lift system of claim 16, wherein, when the loop is bent in a reversible manner in radii of curvature of between 50 mm and 500 mm, the bending force acting on the fiber composite material in the transverse direction is between $\frac{1}{100}$ and $\frac{1}{10,000}$ of the maximally permissible force in the tensile direction.

19. The lift system of claim 16, wherein the fibers arranged in the elastomer matrix material are arranged so as to be substantially mutually parallel and in parallel with the tensile direction.

20. The lift system of claim 16, wherein the fibers of the fiber composite material are selected from the group comprising carbon fibers, glass fibers, and metal fibers.

* * * * *